(12) United States Patent
Niknafs et al.

(10) Patent No.: US 8,282,890 B2
(45) Date of Patent: Oct. 9, 2012

(54) VESSEL CONTAINING FLUID DISTRIBUTION MEDIA

(75) Inventors: Hassan S. Niknafs, Stow, OH (US); Daniel C. Sherman, Hudson, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 209 days.

(21) Appl. No.: 12/704,556

(22) Filed: Feb. 12, 2010

(65) Prior Publication Data

US 2010/0209315 A1    Aug. 19, 2010

Related U.S. Application Data

(60) Provisional application No. 61/152,912, filed on Feb. 16, 2009.

(51) Int. Cl.
  *B01J 8/02*    (2006.01)
  *B01J 35/02*   (2006.01)
(52) U.S. Cl. ........... 422/220; 422/211; 422/217; 261/94

(58) Field of Classification Search ................... 422/211, 422/217, 220; 261/94
See application file for complete search history.

(56) References Cited

U.S. PATENT DOCUMENTS

2006/0196826 A1* 9/2006 Glover ................. 210/510.1
2006/0251555 A1* 11/2006 Warner et al. ........... 422/311
* cited by examiner

*Primary Examiner* — Jennifer A Leung
*Assistant Examiner* — Lessanework Seifu
(74) *Attorney, Agent, or Firm* — Stewart A. Fraser; Thomas G. Field, III

(57) ABSTRACT

A vessel comprising a bed of randomly oriented ceramic media having fluid distribution channels incorporated in the outer surface of the media is disclosed. The channels capture and redirect the fluid thereby improving distribution of the fluid in the vessel.

13 Claims, 6 Drawing Sheets

VESSEL CONTAINING FLUID DISTRIBUTION MEDIA

CROSS-REFERENCE TO RELATED APPLICATION

This application claims the benefit of U.S. Provisional Application No. 61/152,912 filed Feb. 16, 2009.

BACKGROUND OF THE INVENTION

This invention generally relates to a bed of randomly oriented ceramic media used to improve the distribution a fluid by redirecting the fluid over an increasingly larger area as the fluid passes through the bed. More particularly, this invention is directed to a bed topping media, located at one end of a chemical reactor's containment vessel, which redistributes a fluid over a layer of components that may include materials such as catalytically active material, adsorbents or activated carbon.

One example of a patent which discloses fluid distribution materials that may be used to reduce maldistribution of a fluid in a chemical reactor is U.S. Pat. No. 6,291,603.

SUMMARY

This invention provides for improved redistribution of an incoming fluid stream disposed onto a bed of randomly oriented ceramic media by incorporating fluid diverting channels into the outer surfaces of the media. The channels are configured to capture and then redirect a portion of the fluid as it flows through the bed. In some situations, the media may cause the fluid to flow perpendicularly to the initial direction of incoming fluid.

In one embodiment, the present invention includes a vessel comprising a fluid entry point and a bed. The bed comprises a first layer comprising a plurality of individual elements disposed therein. At least a majority of elements in the first layer comprise randomly oriented ceramic media. The ceramic media comprise an outer surface with one or more fluid diverting channels formed therein. The bed also comprises a second layer comprising components wherein the majority of the components are physically distinct from the ceramic media. The first layer of the bed is positioned between the second layer and the fluid entry point.

DETAILED DESCRIPTION

Figure 1:
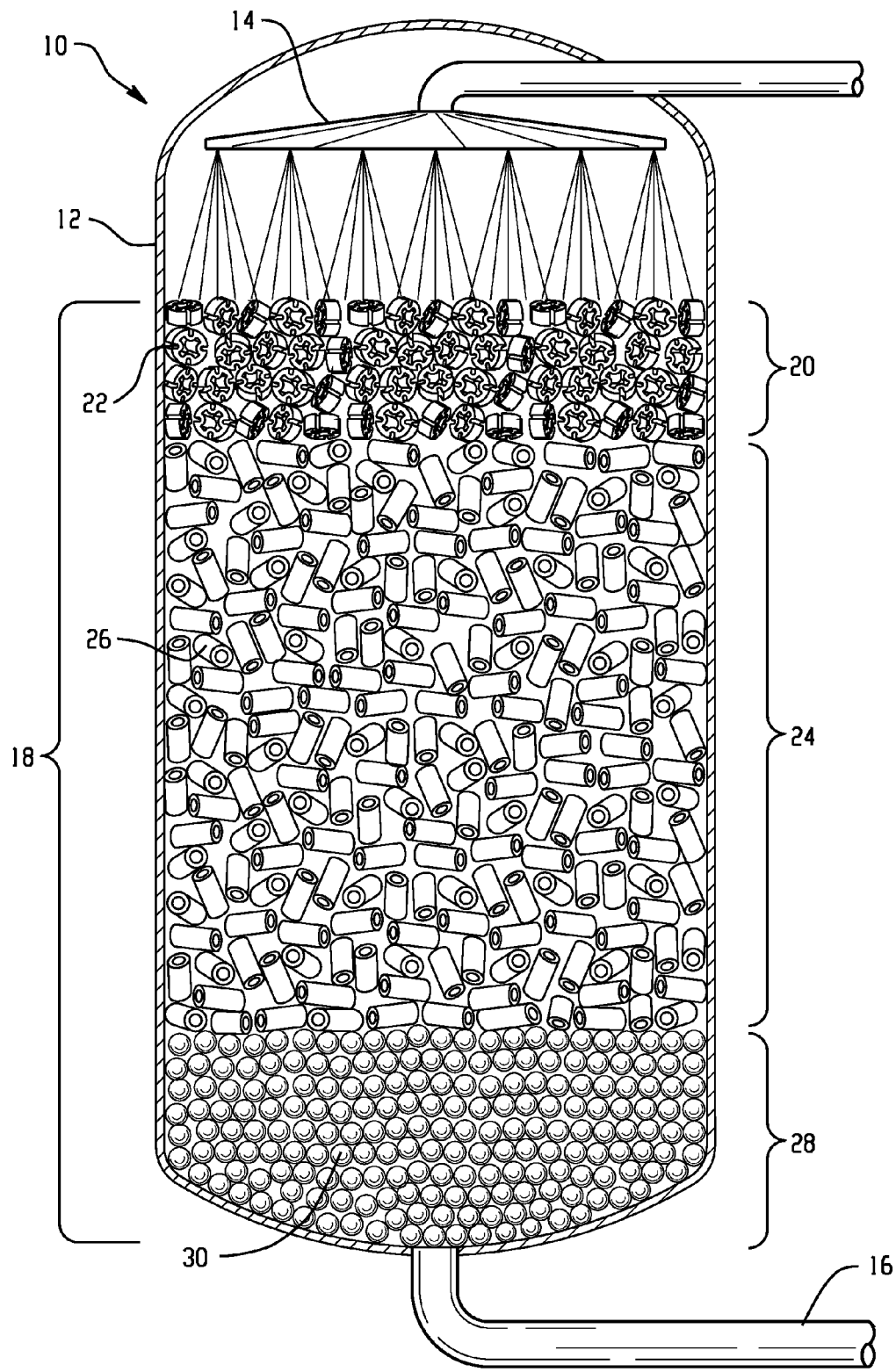
FIG. 1 is a cross-section of a chemical reactor that includes a vessel of this invention.

As used herein, the phrase "chemical processing apparatus" is intended to describe equipment, such as tanks, burners, combustion chambers, piping, etc., that receives one or more raw materials and then chemically and/or physically converts it to one or more end products that are discharged from the apparatus. The conversion may involve: a chemical reaction that utilizes a catalyst to convert raw materials to an end product; desorption or absorption; a physical change (e.g., liquid to gas) to the raw material's state of matter; and/or an increase or decrease in the temperature of the raw material. Chemical reactors are widely used in chemical manufacturing industries for a variety of purposes and are considered to be a subset of the phrase chemical processing apparatus. Chemical reactors may contain a vessel in which the conversion process occurs.

Chemical reactors that generate an end product by providing a vessel with a reaction zone therein where two or more reactants can interact to produce an end product may also include a layer of bed topping material located at one end of the reaction zone and a layer of bed support material located at the opposite end of the reaction zone. Examples of commercially available bed topping materials include ceramic spheres and reticulated foams. One function of the bed topping material is to accept an incoming fluid that is disposed onto a fixed area of the layer of bed topping material and then redirect the fluid over a larger area as the fluid passes through and exits the bed topping layer. The incoming fluid may be disposed onto the bed topping layer via a mechanical device commonly known as a distributor which may include one or more nozzles. The distributor may be described herein as a "fluid entry point". The term "fluid entry point" may also describe a single pipe or a plurality of pipes that collectively or individually dispose one or more fluids onto the bed topping layer. As the incoming fluid contacts the bed topping, the fluid inherently forms an incoming fluid distribution pattern. As the fluid exits the bed of topping material, the fluid inherently forms a final fluid distribution pattern. Bed topping made of ceramic spheres are known to provide for a modest redistribution of the incoming fluid but the ongoing need to substantially increase the redistribution using spheres has not been realized. Similarly, bed topping made of reticulated ceramic foam may include a plurality of web members which define flow passageways through the ceramic material. The web members subdivide the incoming fluid into a plurality of smaller fluid streams which then flow through the reactor. While subdivision of a larger single stream into many smaller streams may be adequate for some industrial processes, lateral redistribution of a fluid over an area much larger than the incoming fluid distribution pattern may be necessary if the operation of the chemical reactor depends upon a broad homogenous distribution of one or more fluids.

Referring now to the drawings and more particularly to FIG. 1, there is shown a cross-sectional view of a chemical reactor 10 that includes a vessel 12, a mechanical distributor 14, and discharge piping 16. The vessel houses a bed 18 that includes a first layer 20 of randomly oriented ceramic media 22, a second layer 24 of components 26 that includes a catalytically active metal deposited onto the surface of a ceramic pellet, and a third layer 28 of bed support media 30. As used herein, the ceramic media in the first layer are considered to be physically distinct from the components in the second layer if the ceramic media have fluid diverting channels and the components do not have fluid diverting channels. Furthermore, first layer 20 may include elements that are not randomly oriented ceramic media provided at least the majority of elements in the first layer are randomly oriented ceramic media. Preferably, all of the elements in the first layer are ceramic media that have fluid diverting channels incorporated therein. Similarly, the ceramic components that comprise the second layer are all devoid of fluid diverting channels in the outer surface and thus are distinct from media in the first layer. However, the advantages of this invention may be realized if at least the majority of the second layer's components are physically distinct from the ceramic media in the first layer. Referring again to FIG. 1, the second layer may also be described as the reaction zone. Bed 18 has a known height and the first layer occupies less than 20% of the bed's height. The second layer may occupy more than 50% of the bed's height. If desired, the third layer could be replaced with a screen located beneath the second layer. A suitable commercially available bed support media, identified by the trademark deltaP™, is available from Saint-Gobain NorPro of Stow, Ohio, USA.

Figure 2:
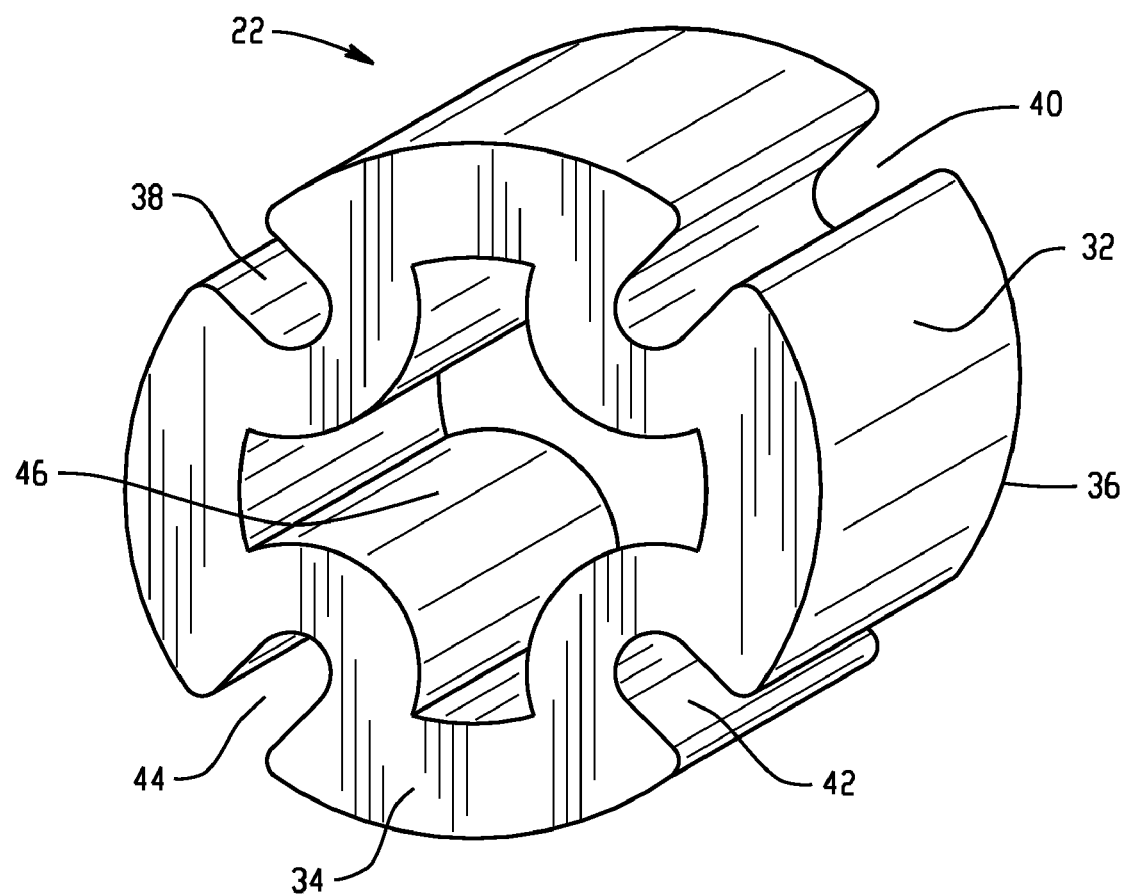
FIG. 2 is a perspective view of a first embodiment of a ceramic media useful in the first layer shown in FIG. 1.

FIG. 2 discloses a perspective view of one embodiment of ceramic media 22 that would be suitable for use in first layer 20 of vessel 12 as shown in FIG. 1. The media includes a peripheral wall 32, a first end 34, a second end 36, and four fluid diverting channels 38, 40, 42 and 44 that extend from the first end to the second end. In this embodiment, the four fluid diverting channels have the same cross-sectional shape. As will be shown in FIG. 3, the shapes of the channels may be altered. Opening 46, which is an optional feature of a suitable media, defines an internal passageway through the media and also extends from the first end to the second end. The shape, size and existence of opening 46 may be altered significantly without influencing the performance of the fluid diverting channels.

Figure 3:
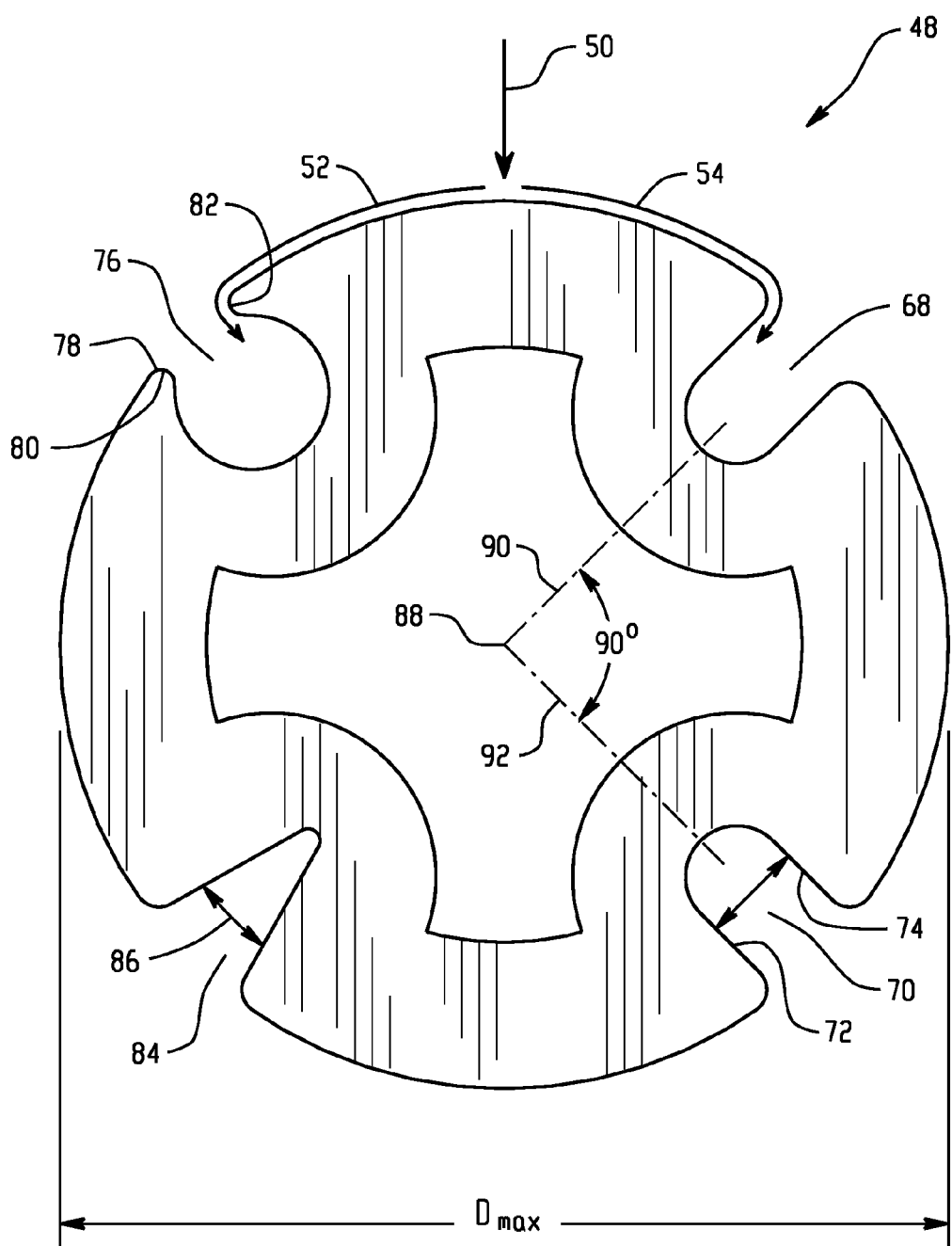
FIG. 3 is an end view of a second embodiment of a ceramic media useful in the first layer shown in FIG. 1.

Shown in FIG. 3 is an end view of another embodiment of a suitable media 48 for use in first layer 20. As illustrated in FIG. 3, the cross-sectional shape of the fluid diverting channels may be modified provided the channel effectively captures and diverts a portion of the fluid that contacts the peripheral surface of the media (see arrow 50) and then flows over the peripheral wall's curvilinear surface into one or more of the fluid diverting channels (see arrows 52 and 54) wherein at least a portion of the fluid is redirected to an end of the media. Fluid to that impacts the peripheral wall at a perpendicular angle, then flows into and through a fluid diverting channel, thereby changing the direction of the fluid's flow, is defined herein as horizontally displaced fluid. A plurality of randomly oriented media having the fluid diverting channels described herein will cause a fluid flowing through the media to be rapidly diverted as much as 90° relative to the initial direction of the fluid flow. The diversion occurs repeatedly as the fluid contacts and then exits a first media, then contacts and exits a second media, then contacts and exits a third media, etc.

When media that have fluid diverting channels formed in the outer surface are used in a vessel as shown in FIG. 1 and the media form the first layer which is positioned between the fluid's port of entry and the second layer of components, then the fluid diverting channels in the ceramic media cooperate to establish numerous fluid dispersion passageways through the first layer. A fluid dispersion passageway includes two or more channels formed in two or more media through which the fluid flows after leaving the port of entry and prior to contacting the second layer. If fluid flows through a fluid diverting channel in a first media and then flows through another fluid diverting channel in a second media, then the fluid is considered to have flowed through a fluid dispersion passageway. The direction that the fluid flows is not important provided the fluid flows first through the first layer and then the second layer. In a down flow chemical reactor, gravity causes the fluid to flow downwardly from the distributor, through the first layer and then the second layer. In an upflow chemical reactor, the fluid's entry point is located near the bottom of the vessel and the first layer is located below the second layer. A pump of similar device is used to force fluid upwardly through the first layer and then the second layer.

Figure 4:
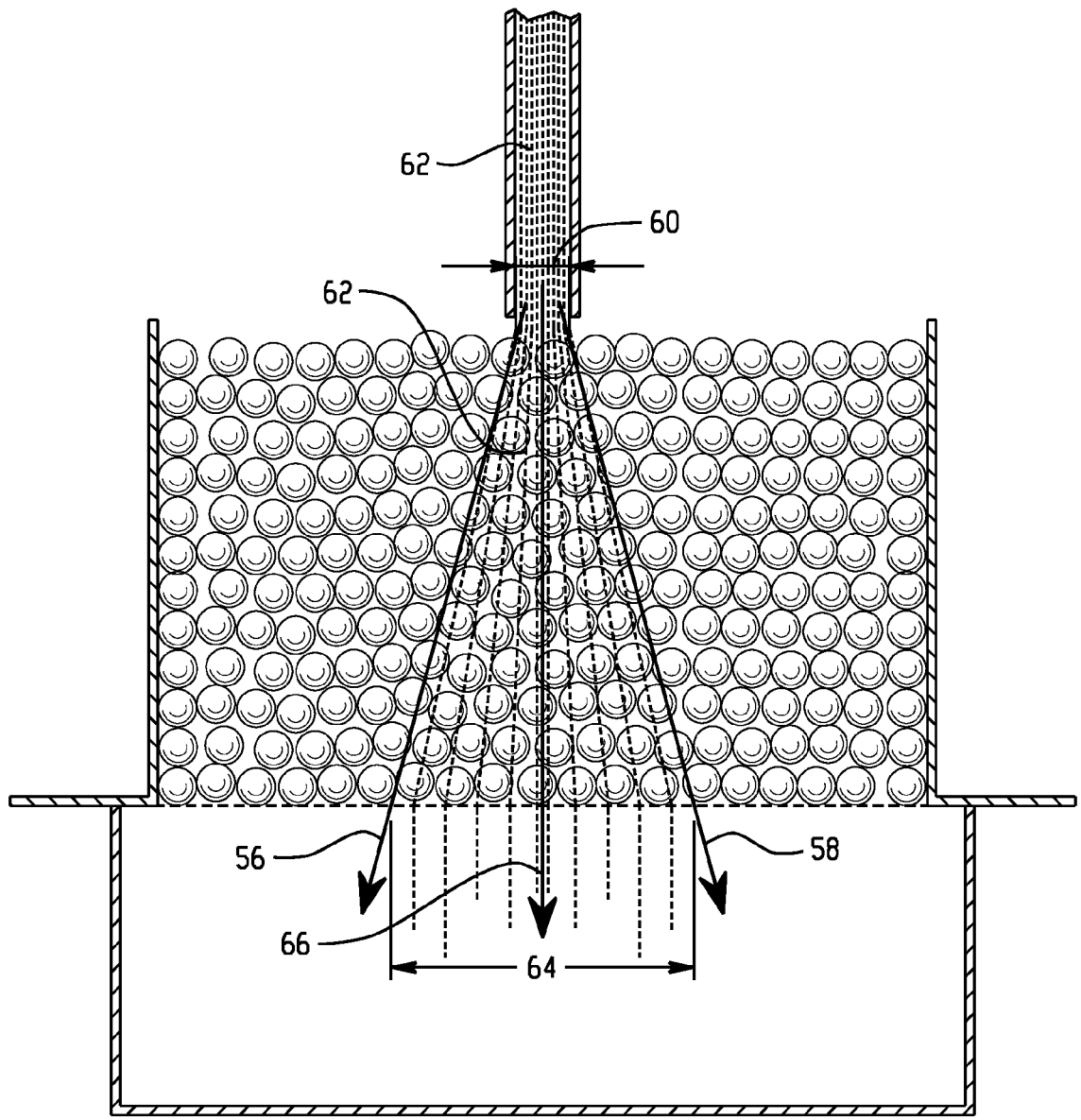
FIG. 4 is a theoretical cross-sectional view of a fluid distribution pattern.

As shown in FIG. 4, a theoretical cross-sectional view of a fluid distribution pattern created by a fluid as it flows through a plurality of media may resemble a cone shaped zone (see arrows 56 and 58) wherein the top of the cone 60 is the point at which the fluid 62 contacts the top surface of the media and the bottom of the cone 64 is the pattern created by the fluid as it exits the bottom of the plurality of media. The media's fluid diverting channels may simultaneously to achieve two objectives. First, the fluid flowing through the media is redirected over a wider and wider area as the fluid passes through the bed of media. The amount of horizontal displacement per unit of vertical travel may be measured and used to calculate a media bed's fluid distribution angle which is defined as the angle between a line, such as line 66 which defines the center of the cone in FIG. 4, and the closest side of the cone as represented by arrow 56. A large fluid distribution angle, such as 15° or larger, is preferred to a small fluid distribution angle, such as 10° or less. In addition to having a large fluid distribution angle, media with fluid distribution channels incorporated therein advantageously provide for homogenous distribution of the fluid within the cone shaped dispersion zone. Achieving both homogenous distribution of fluid within the cone shaped zone and a large fluid distribution angle may be preferable to achieving either a large distribution angle and non-homogenous distribution within the cone or a homogenous distribution within the cone and a small fluid distribution angle.

To effectively divert a fluid into a wider and wider pattern as the fluid travels through a plurality of media, parameters such as physical characteristics of the media; the media's fluid diverting channels, and the plurality of media may be modified independently or, preferably, in concert with one another. Characteristics of the channel that may be modified to impact horizontal displacement of the fluid include the width of the channel, the depth of the channel, the length of the channel and the cross-sectional shape of the channel. Similarly, characteristics of the media that may be modified to impact horizontal displacement of the fluid include: the rotational angle between the centerline of the channels; and the ratio of the media's maximum diameter to its length. One characteristic of the bed that may be modified to impact horizontal displacement of the fluid is the depth of the bed.

With regard to the channels, a fluid diverting channel may be configured to allow some of the fluid to easily enter the channel and then inhibit the escape of at least a portion of the fluid from the channel until the fluid travels through the channel to one end of the media. The depth of channel 68 in FIG. 3 is approximately 17% of the maximum diameter $D_{max}$ of the media. The depth of the to channel may be between 15% and 25% of the media's maximum diameter. Channels having depths between 10% and 45% of the media's maximum diameter are feasible. For channels that are defined by opposing walls that are substantially parallel with one another, such as the walls that define channel 70, the width of the channel is determined by measuring the distance between opposing walls 72 and 74. In contrast to channels that have substantially parallel walls, a channel, such as channel 76, may be designed to have an overhang 78 which reduces the size of the channel's opening. For channels that include an overhang, the width of the opening is the distance between opposing portions of the overhang, see overhang portions 80 and 82. If the channel gradually tapers in width from the top of the channel to the bottom of the channel, then the width of the channel is defined as the width between opposing walls at one-half the depth of the channel. See FIG. 3, channel 84, arrow 86. Channels that perform adequately may have a depth to width ratio between 1.2:1.0 and 3.0:1.0. Channels that have a depth to width ratio less than 1.2:1.0 may be too shallow to retain fluid in the channel. Channels that perform adequately may have a length to width ratio between 2:1 and 20:1.

As indicated above, one characteristic of the media that has an impact on the fluid distribution capability of the media is the rotational angle between the channels. The rotational angle is defined as the angle formed by the intersection 88 of centerline 90 in channel 68 and centerline 92 in adjacent channel 70. As shown in FIG. 3, the channels may be positioned 90° from one another so that the media has four channels. While a minimum of three equally spaced channels may be workable, four equally spaced channels are preferred. Media having either five or six equally spaced channels are feasible. As shown in FIG. 2, the cross-sectional shape of each channel in one media may be the same. However, as shown in FIG. 3, the cross-sectional shape of the channels does not need to be the same for each channel. Furthermore, all of the media in a layer of media do not need to be identical.

Another media characteristic that may be altered to improve the fluid distribution of a layer of ceramic media in a vessel is the ratio of the media's to length to its diameter, which is defined herein as the L:D ratio, and may range from 0.5:1.0 to 2.5:1.0. If the ratio is less than 0.5:1, the media will tend to orient with the ends perpendicular to the flow of the fluid which adversely impacts the channels' ability to disperse the fluid in a horizontal direction. If the media's length to diameter ratio is greater than 2.5:1.0, the vast majority of media may tend to orient perpendicularly relative to the direction of the initial fluid flow which could unduly increase the pressure drop within the bed. If the pressure drop within the bed increases beyond an acceptable level then the reactor must be shut down.

With regard to characteristics of the bed that may be altered to achieve adequate distribution of many fluids, the average bed depth should be at least five times the length of the media. In some applications the average bed depth may be at least 10 times the length of the media. If the minimum bed depth is too shallow, the media will have little influence on the distribution of the fluid.

Ceramic media that is useful in a vessel of this invention, including the ceramic media shown in FIGS. 2 and 3, may be formed from any ceramic material that provides sufficient strength for the media and is compatible with the fluids to be used. For example, materials such natural or synthetic clays, feldspars, zeolites, cordierites, aluminas, zirconia, silica or mixtures of these may be used. Clays are generically mixed oxides of alumina and silica and include materials such as kaolin, ball clay, fire clay, china clay, and the like. Suitable clays are high plasticity clays, such as ball clay and fire clay. The clay may have a methylene blue index, ("MBI"), of about 11 to 13 meq/100 gm. The term "feldspars" is used herein to describe silicates of alumina with soda, potash and lime. Other components such as quartz, zircon sand, feldspathic clay, montmorillonite, nepheline syenite, and the like can also be present in minor amounts of the other ceramic forming components.

Materials fired together to produce the ceramic bed topping media may be supplied in fine powder form and may be made into a shapeable mixture by the addition of water and/or processing aids, such as bonding agents, extrusion aids, lubricants, and the like to assist in the extrusion process. The mixture can be to processed using several different techniques, such as extrusion or pressing using dry pressing techniques to achieve the desired shape. For example, an initial extrusion process may be followed by cutting perpendicular to the direction of extrusion into the desired lengths. An initial drying may be used to drive off water. This may avoid disrupting the relatively weak structure of the greenware and may be carried out at below about 120° C. and, in one embodiment, below about 70° C. and may last for about 5 hours. The bodies may then be processed at high temperatures, for example, a maximum temperature of from 1100° C. to 1400° C., in one embodiment, at least 1200° C., and in another embodiment, about 1250° C., to form a dense body that typically has less than 1.5% apparent porosity, and in one embodiment, less than 0.7% apparent porosity. However, the porosity may be up to about 15% for some applications. The firing temperature may depend, to some degree, on the composition of the elements, and in general, may be sufficient for the bulk of the material to achieve a low porosity. This is in contrast to reticulated ceramic bodies that typically have up to 30-80% apparent porosity or intra-material voids, and which thus may be unsuited to capturing fluid in a fluid diverting channel rather than allowing the fluid to pass through the media's intra-material voids.

The ceramic media may be fabricated from a mixture of clays and feldspars and other minor ingredients to form a resultant body that is comprised mainly of silicon oxide and aluminum oxide (an aluminosilicate). For example, the mixture used to form the elements may comprise at least about 90% of ceramic forming ingredients and the balance (typically up to about 10%) of processing aids. The ceramic forming ingredients may comprise 20-99% aluminum oxide and 0-80% silicon oxide. The processing aids may be largely volatilized during firing. The dry ingredients may be thoroughly mixed before water is added in an amount sufficient to enable the mixture to be shaped into the desired form and to retain that form during firing. Generally, the amount of water added may be from 12 to 30 ml for every 100 gm of the mixture of dry ingredients. The shapeable mixture can then be molded, or extruded to form the desired shape before the shape is fired in a kiln to a maximum temperature of to from 1100° C. to 1400° C. The temperature in the kiln may be increased at a rate of between 50 to 90° C./hr. and the dwell time at the calcining temperature may be from 1 to 4 hrs before the kiln is allowed to cool to ambient temperatures.

Where ceramic media are produced by an extrusion or a dry-pressing process, they can have an essentially uniform cross-section along one axial direction which provides an axis of symmetry for the element.

Figure 5:
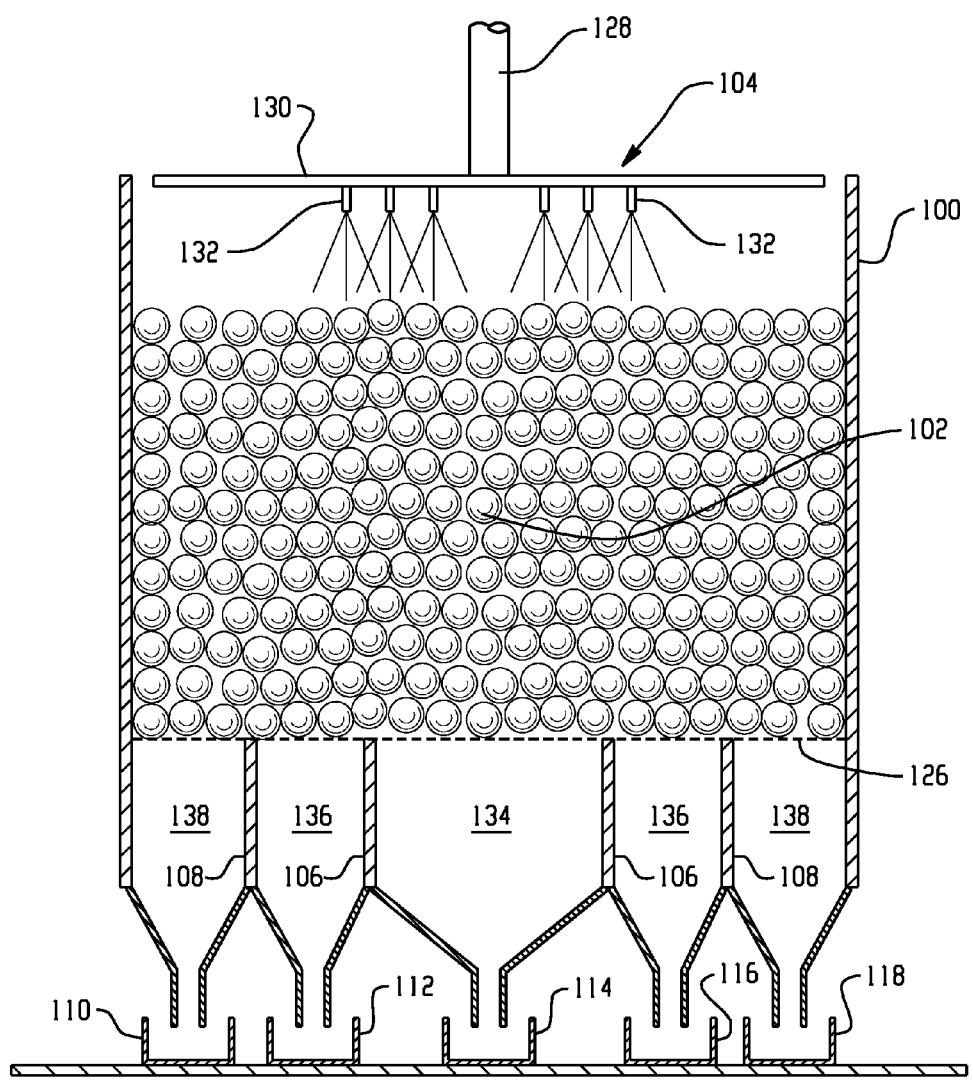
FIG. 5 is a schematic drawing of a liquid distribution testing device.
Figure 6:
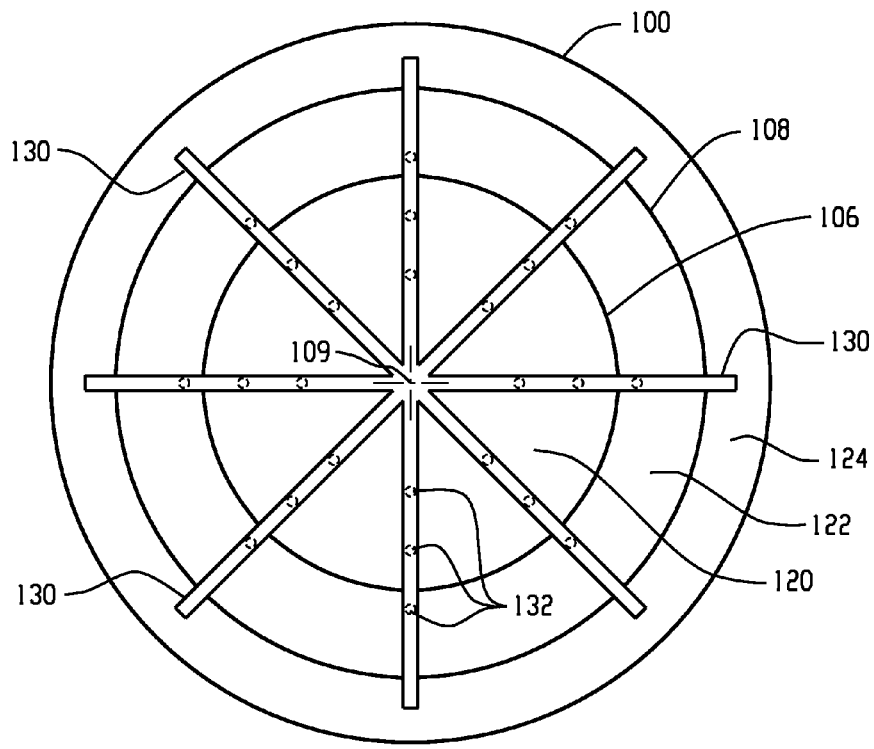
FIG. 6 shows a diagram of the central, intermediate and outer regions of the testing device shown in FIG. 5.

To evaluate the fluid distribution characteristics of different bed topping media, including the media shown in FIG. 2, the liquid distribution testing device shown in FIG. 5 was constructed and operated as will now be described. The test device included a vertically oriented and tubularly shaped retaining wall 100 that was open on both ends and housed a bed of media 102, a mechanical distributor 104 located above the bed, a first divider ring 106 and a second divider ring 108, both rings located below the bed and concentrically aligned with the center of the vessel, and a plurality of fluid collection bins 110, 112, 114, 116 and 118 located beneath the rings. FIG. 6 is a top view of the testing device. The rings were carefully positioned so that the first divider ring defined the central region 120, the second divider ring and the first divider ring cooperated to define the boundaries of the intermediate region 122, and the second divider ring and the retaining wall defined the boundaries of the outer region 124. Each of the regions occupied one-third of the bed's surface area. A sufficient quantity of the media shown in FIG. 2 were made by forming a mixture of clay, feldspars, and organic extrusion aids comprising about 25 weight percent alumina, 68 weight percent silica which was combined with water. A portion of the mixture was extruded through a die, sectioned into lengths, and fired at a temperature of approximately 1200° C. to form the ceramic media. The evaluation test began by loading a plurality of the media into the testing device. The media were loaded to a constant depth of 18 cm and rested on top of a wire mesh support screen 126 with defined square shaped openings that were approximately 5 mm by 5 mm. The distributor included connector piping 128 and, as shown in FIG. 5, and eight horizontal arms 130, see FIG. 6, which were secured to the connector piping 128 and radially distributed from the center 109 of the testing device. Each of the to eight horizontal arms included three openings 132, thereby resulting in a total of 24 openings, which were uniformly spaced along the arm and functioned as nozzles. Sixteen of the 24 openings were positioned above the central region. Eight of the 24 openings were positioned above the intermediate region. None of the openings were positioned above the outer region. The diameter of each opening 132 was approximately 8 mm. Prior to measuring the amount of water flow in each region and thereby determining the fluid distribution pattern, the media was allowed to become fully wetted by allowing water to flow through the distributor and onto the top of the bed of media for approximately thirty minutes without capturing and measuring the quantity of water as it flowed from the bed. After the media has been wetted, the fluid was allowed to flow onto the media bed at the rate of 18.9 l/min (5 gallons per minute). The average flow rate of water through each nozzle was approximately 0.79 l/min (0.208 gallons per minute). As described above, when the water contacted the individual members of the bed of media the water flowed over a wider and wider area as the water was diverted by the media's fluid distribution channels. After the water exited the bed of media and flowed through the wire mesh screen, the water was collected in a series of circular troughs 134, 136 and 138 which corresponded with the central region, intermediate region and outer region, respectively. The quantity of liquid in each trough was measured and the weight percentage of liquid in each trough was then calculated.

The testing device described above was used to evaluate the fluid distribution characteristics of two commercially available bed topping media and the media shown in FIG. 2. The two commercially available media are commonly known as 19 mm Pentarings and 19 mm ceramic balls. Both the Pentarings and ceramic balls are commercially available from Saint-Gobain NorPro in Stow, Ohio, USA. The Pentarings are ceramic media, which when viewed from one end, resemble a wagon wheel that has a centrally located hub and five equally spaced spokes which extend radially from the hub to a peripheral wall. The spokes and wall define five triangularly shaped openings through the Pentaring media. The to Pentarings were 10 mm in height and 19 mm in diameter. Shown in Table 1 below are the quantities of water, measured as kg/min, which flowed into the central, intermediate and outer regions when each of the bed toppings described above were evaluated. The percentage deviation between the quantities of water that flowed into the central and intermediate regions is shown in the column on the right side of the table.

TABLE 1

|  | Central Region kg/min | Intermediate Region kg/min | Outer Region kg/min | Percent Deviation Between Central and Intermediate |
|---|---|---|---|---|
| 19 mm Pentarings | 9.5 | 10.9 | 2.0 | 14.7 |
| 19 mm ceramic balls | 8.0 | 11.0 | 1.6 | 37.5 |
| Media shown in FIG. 2 | 8.1 | 7.4 | 2.5 | 8.6 |

TABLE 1-continued

The data clearly shows that the media with the fluid diverting channels incorporated in the outer surface of the media provided more lateral distribution of the water than either the Pentarings or ceramic balls because the percent deviation between the central region and intermediate region for the media shown in FIG. 2 was 8.6% while the percent deviation between the central region and intermediate region for the Pentarings and ceramic balls was 14.7% and 37.5%, respectively. The data supports the conclusion that the media with the fluid distribution channels provided greater horizontal displacement than either of the other bed topping media when evaluated at the same bed depth. Media suitable for use in a vessel of this invention have less than a 12% difference between the distribution in the testing device's central region and its intermediate region. Preferably, the difference is less than 10%.

Figure 7:
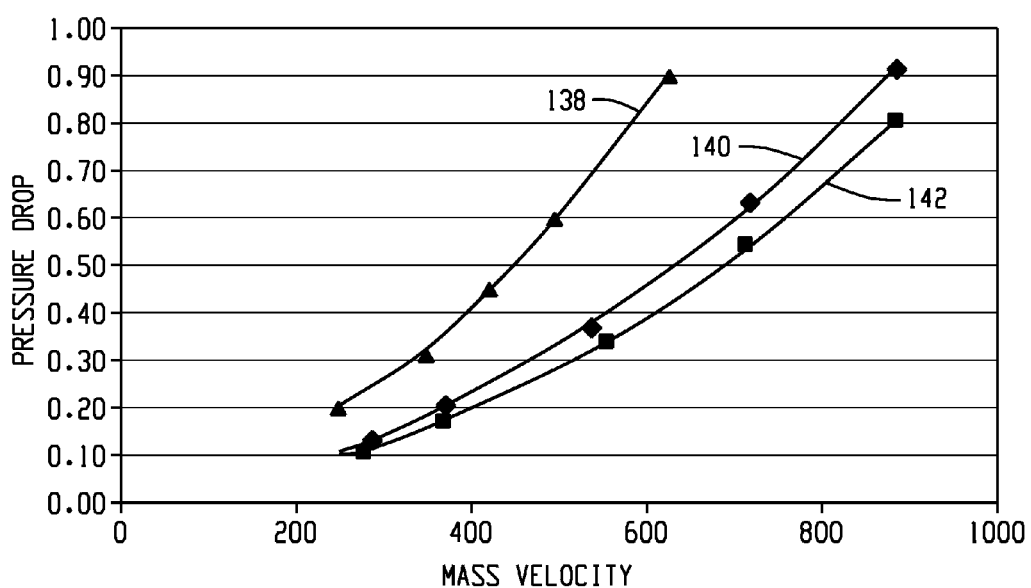
FIG. 7 is a graph of pressure drop versus mass velocity.

In addition to providing lateral redistribution of fluid as the fluid passes through the first layer, the ceramic media in the first layer inherently impacts the pressure drop across the bed relative to the pressure drop across a bed without a first layer of bed topping. However, ceramic media with fluid distribution channels incorporated in the outer surface advantageously provide less increase in pressure drop than a first layer that consists of 19 mm ceramic spheres or 19 mm to Pentarings. Shown in FIG. 7 is a graph of pressure drop versus mass velocity for ceramic spheres, Pentarings and the ceramic media shown in FIG. 2. Line 138 represents the data obtained when evaluating only spheres. Similarly, lines 140 and 142 represent data obtained when evaluating only Pentarings and the ceramic spheres shown in FIG. 2, respectively. The graph supports the conclusion that pressure drop increases most rapidly for the spheres and least rapidly for the ceramic media with fluid distribution channels in the outer surface. The combination of relatively low pressure drop and broad, homogeneous horizontal distribution of a fluid as it passes through a bed of ceramic media may be desirable characteristics for the operation of a chemical reactor.

The above description is considered that of particular embodiments only. Modifications of the invention will occur to those skilled in the art and to those who make or use the invention. Therefore, it is understood that the embodiments shown in the drawings and described above are merely for illustrative purposes and are not intended to limit the scope of the invention, which is defined by the following claims as interpreted according to the principles of patent law.

What is claimed is:

1. A vessel, comprising: a fluid entry point; and a bed, said bed comprising a first layer comprising a plurality of individual elements disposed therein, wherein at least a majority of elements in the first layer comprise randomly oriented ceramic media, said ceramic media comprising an outer surface with one or more fluid diverting channels formed therein, wherein each fluid diverting channel has a depth and a width and the ratio of the channel's depth to width exceeds 1.2:1.0 and does not exceed 3.0:1.0; a second layer comprising components wherein the majority of the components are physically distinct from the ceramic media; and wherein the first layer of the bed is positioned between the second layer and the fluid entry point.

2. The vessel of claim 1 wherein only said ceramic media in said first layer comprises an outer surface with fluid diverting channels formed therein.

3. The vessel of claim 1 wherein said first layer's media comprise a first end, a second end and said fluid diverting channels extend therebetween.

4. The vessel of claim 3 wherein said first layer's media each comprise a peripheral wall extending between said ends and said fluid diverting channels formed in said peripheral wall.

5. The vessel of claim 4, wherein the peripheral wall defines the media's maximum diameter and the depth of said fluid diverting channel exceeds 10 percent of the media's maximum diameter.

6. The vessel of claim 5, wherein the depth of each fluid diverting channel exceeds 15 percent of the media's maximum diameter.

7. The vessel of claim 5, wherein the depth of each fluid diverting channel does not exceed 40 percent of the media's maximum diameter.

8. The vessel of claim 6, wherein the depth of each fluid diverting channel does not exceed 25 percent of the media's maximum diameter.

9. The vessel of claim 1 wherein each fluid diverting channel has a length and a width and the ratio of the channel's length to width exceeds 2:1 and does not exceed 20:1.

10. The vessel of claim 1 wherein the majority of said media have a length and a cross-sectional diameter and the media's length to diameter ratio exceeds 0.5:1.0 and does not exceed 2.5:1.0.

11. The vessel of claim 1 wherein said bed defines a bed depth and said first layer occupies less than 20 percent of said bed depth.

12. The vessel of claim 1 wherein the majority of said media have substantially the same length and the minimum depth of said first layer is at least 5 times greater than said media's length.

13. The vessel of claim 1 wherein said second layer's components comprise a material selected from the group consisting of: a catalytically active metal, adsorbents, mass transfer media, heat transfer media and filtration media.

* * * * *